UNITED STATES PATENT OFFICE.

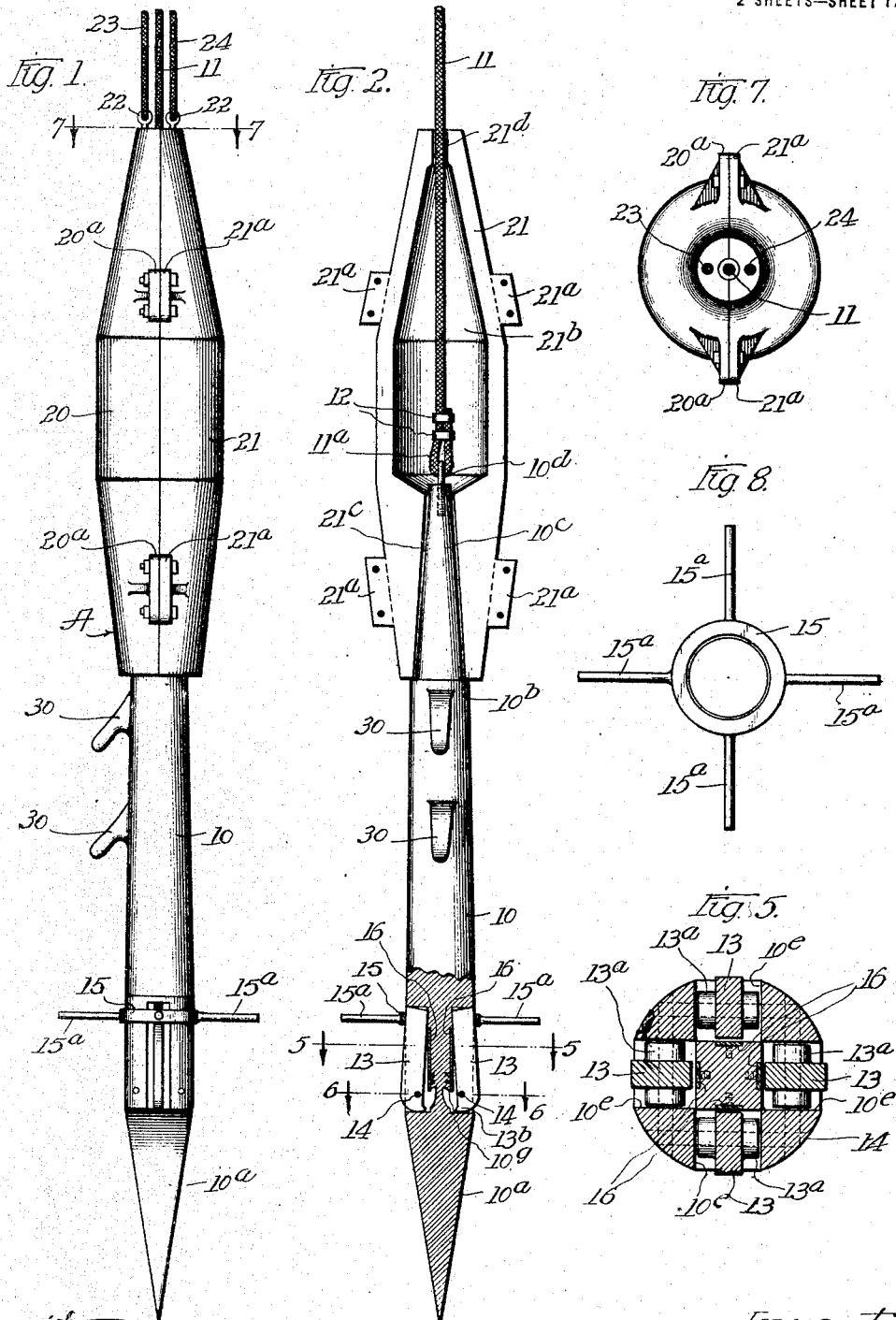

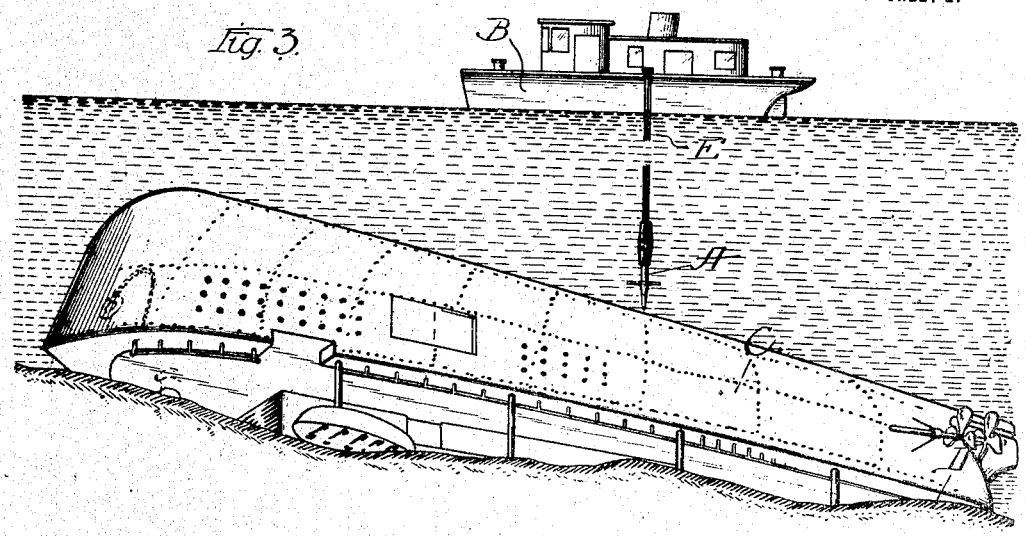
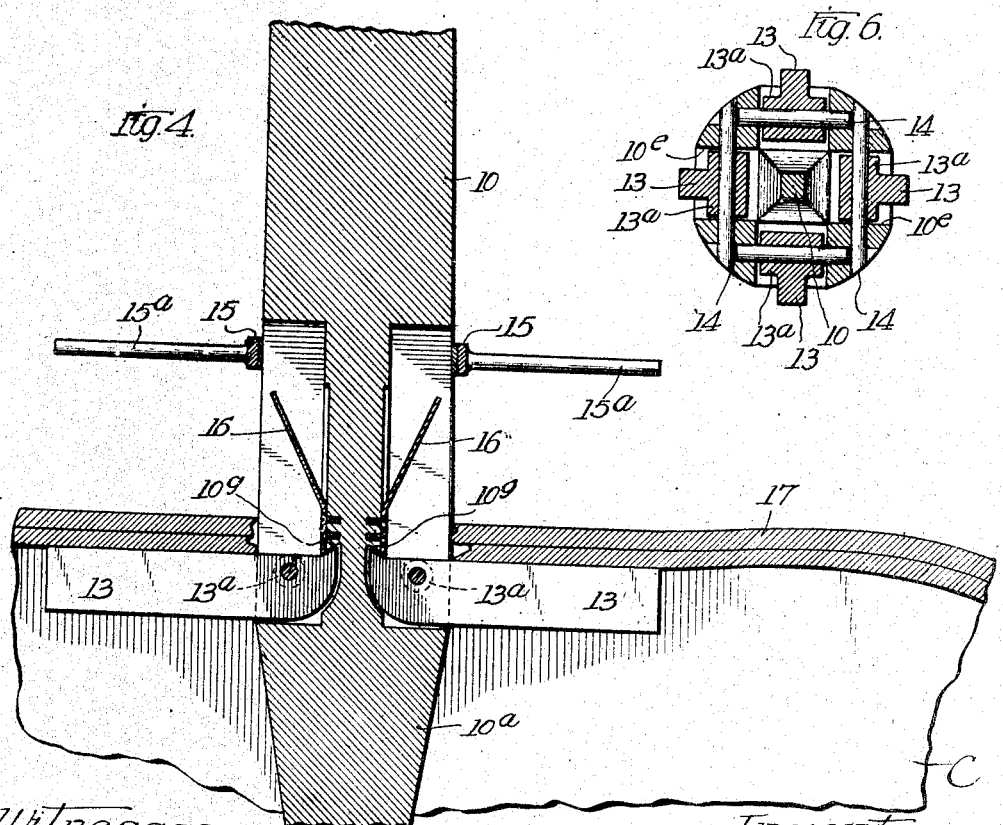

JOHN T. COWLES, OF CHICAGO, ILLINOIS.

DEVICE FOR RAISING SUNKEN VESSELS.

1,186,889.  Specification of Letters Patent.  Patented June 13, 1916.

Application filed April 25, 1914.  Serial No. 834,295.

*To all whom it may concern:*

Be it known that I, JOHN T. COWLES, a citizen of the United States, residing at Chicago, in the county of Cook and State of Illinois, have invented certain new and useful Improvements in Devices for Raising Sunken Vessels, of which the following is a specification.

The invention relates to a device in the nature of a harpoon adapted to be operated beneath the surface of relatively deep bodies of water for making secure attachment to sunken vessels in particular, in order to raise them to the surface, and it is the object of the invention to produce an improved device that may be operated from the surface of the water, particularly under conditions where the depth of the water over the object to be raised is so great that it is impractical or impossible for human beings to descend to such depth to make attachment of lifting cables, or chains, or other lifting objects to the sunken vessel or object to be raised.

A further object of the invention is to provide an improved device so that when once the vessel or other object in the water to be raised is located, the device upon contacting with the object to be raised will be capable, by its own weight, of piercing the object to be raised, and thereby firmly attaching itself thereto for the purpose of raising the vessel or other object to which the device shall be attached.

A further object of the invention is to provide an improved device of the character described which shall be provided with piercing means and associated driving means by which the piercing means may be caused to pierce the wall or outer covering of a vessel or other object to be raised, whereby the device may be firmly attached to the vessel or object to be raised.

A further object of the invention is to provide improved means which shall be inoperative during the operation of piercing the wall of the vessel or other object to be raised, but which upon the piercing of the same by the device shall operate to firmly and securely attach the device to the vessel or object to be raised.

Other objects of the invention will appear from the following description of the invention, which is directed to the preferred embodiment thereof and is illustrated in the drawing attached hereto and forming a part of this specification, and finally more particularly described in the appended claims.

In the said drawing: Figure 1 is a side elevation of my improved device with a small portion only of the lifting and controlling cables being shown, the remainder being broken away. Fig. 2 is a view taken at right angles to the view of Fig. 1, a portion of the upper part of the device being shown removed and the lower portion thereof being in section, in order to disclose the details of construction of the interior parts of the device for attachment to the vessel or other object to be raised. Fig. 3 is a view illustrating the manner in which the device may be operated from a boat or other means floating on the surface of the water, there being an illustration of the boat or other object to be raised shown lying on the bottom of a body of water. Fig. 4 is an enlarged view showing parts of the device in vertical section and disclosing details of construction of the means for attaching the device to the vessel or other object to be raised. Fig. 5 is a detail sectional view on line 5—5 of Fig. 2. Fig. 6 is a similar view on line 6—6 of the same figure. Fig. 7 is a top plan view showing the cable attaching devices in section, being taken on line 7—7 of Fig. 1. Fig. 8 is an enlarged detail view of the device for locking or securing the attaching means in the inoperative position.

It is well known that it is impossible to use diving apparatus for permitting living beings to descend beneath the surface of the water in relatively deep bodies of water to a distance greater than a few hundred feet, on account of the water pressure, which pressure is augmented in a very rapidly increasing ratio according to the depth. Therefore, in attempting to raise objects from the bottom of relatively deep bodies of water, such as the lakes and oceans, it is absolutely necessary to provide means for securing attachment to such objects as are desired to be raised by some means which may be operated from or near the surface of the water. My invention is, therefore, directed to an improved device that may be lowered from or near the surface of the water by one or more cables, the device itself being indicated generally by reference character A, of Fig. 3, B indicating a boat or other support near the surface of the water, from which the device is lowered, while C represents a sunken vessel desired to be raised, lying upon the bottom of a body of water, which bottom is indicated by the reference character D.

The reference character E, in Fig. 3, designates generally one or more flexible cables, by which the device A is operated.

The essential feature of my invention is the construction of the harpoon device, indicated generally by the reference character A of Fig. 3, the details of which are shown in the remaining views, and a complete side elevation view of this device is shown in Fig. 1.

Reference numeral 10 designates generally a solid cast or forged metallic pointed instrument or harpoon, the lower extremity of which is indicated at $10^a$, and is of pyramidal form, this pointed portion being hardened, if necessary and desirable to enable the device to pierce the metallic covering or plates of a sunken vessel. The member 10 is preferably made of a size and of solid metal construction to weigh about one and one-half tons, although for various conditions and depths of water the size and weight of this member may be varied. The shank of this pointed member 10 is preferably constructed at its upper extremity to form a peripheral shoulder, as indicated at $10^b$, and above the shoulder $10^b$ is a gradually diminishing section in the form of the frustum of a cone, indicated by the reference character $10^c$, this portion being formed integral with the body portion of the piercing member 10 and being provided with a screw-threaded opening in its upper extremity adapted to take the threaded eye-bolt $10^d$, into which the operating lifting cable 11 is threaded or looped, as indicated at $11^a$, the free end of the loop being secured to the body of the cable by suitable fastening means, as indicated at 12.

It will be apparent that the purpose of the spear-like pyramidal pointed lower extremity $10^a$ of the device is for the purpose of piercing the wall, hull, or armor of a vessel or other object to be raised, and the function of the device is to secure a firm hold upon the hull or wall of the vessel or object to be raised, in order that the cable 11 may be effective to exert its full lifting strength, if desired, upon the object to be raised. Under some conditions, as where the hull of the vessel is of relatively thin metal, the weight of the device 10 upon coming in contact with the outer shell or covering of the object to be raised, may be effective to pierce the same, and in order that the device may secure a firm lifting hold, to prevent its withdrawal after the piercing of the shell or plate of the vessel, I provide improved means which shall be normally folded out of the way, to afford the device a relatively smooth shank or body for passing beneath the surface of the plate or hull, after the piercing of the same by the pointed portion $10^a$, the same being in the form of pivoted grappling arms, designated by the reference character 13, the same being provided with hub portions, as indicated at $13^a$, Figs. 5 and 6. There are preferably four of the pivoted members 13 employed, being positioned around the periphery of the shank 10 at or near the upper extremity of the tapered portion $10^a$ and being distributed from each other at angles of approximately ninety degrees, as illustrated in Figs. 2 and 4 to 6 inclusive. The pins or journals on which the members 13 have their hub portions journaled are designated by the reference character 14. In order to accommodate the pivoted members 13, the piercing member 10 is provided with suitable housings by the cutting away of the material as indicated at $10^e$.

15 is a metallic ring, provided with a plurality of radial arms $15^a$ and being of a size adapted to pass freely over the shank of the member 10, which latter is preferably constructed of a slightly conical form, enlarged downwardly, so that its largest diameter is in the neighborhood of the housings of the pivoted members or barbs 13.

In operating the device, when by the impact of the same due to the momentum imparted by its weight, or other means, the pointed end $10^a$ has pierced through the wall, hull, or outer covering of the vessel or other object to be raised, the device is passed inwardly through the opening thus formed, past the pivoted members or barbs 13, which are designed to be normally held in the closed position in the housings $10^e$ by the encircling member 15, as indicated in Fig. 2, and it will be apparent that the contact of the hull, wall, or shell thus pierced, with the arms $15^a$ of the ring 15 will cause it to be pushed upwardly over the shank of the member 10, so that it will clear the upper extremities of the folded members or barbs 13, which movement of this retaining member will free the barbs 13 and cause their free extremities to be projected outwardly on their pivotal connections 14, under the action of the flat springs 16, which are secured to the inner walls of each of the casings, until their inner extremities $13^b$ contact with the shoulders $10^g$ (see Fig. 2), which latter are preferably formed integral with the body of the member 10 and are produced by offsets in the housings $10^e$, as illustrated. The pivoted members or barbs 13 will by this construction be securely held in their extended position at approximately right angles to the longitudinal axis of the piercing member 10, and will prevent the withdrawal of the same from the walls of the vessel intended to be raised, which walls are indicated on the drawing, Fig. 4, by the reference character 17.

Although the piercing member 10 of my device may be constructed of solid steel and, under ordinary circumstances, for the heaviest class of work would weigh about one and one-half tons, for deep sea work I provide a supplemental weight, preferably in the form of a two-part casing or shell, as indicated by the reference characters 20 and 21, these parts being substantially duplicates and having coöperating ears 20ª and 21ª cast thereon, by which they may be secured together with suitable retaining bolts, as indicated in the drawings. In Fig. 2 is shown the inner side of one of the members 21, from which the details of construction may be seen. The interior may be provided with a cavity, as indicated at 21ᵇ, and at its lower extremity is preferably provided with a conical opening, as indicated at 21ᶜ, adapted to register over the conical upper end 10ᶜ of the member 10, the lower extremity of the same being adapted to contact with the peripheral shoulder 10ᵇ on the member 10 at the bottom of the conical part 10ᶜ. The upper extremity of the members 20, 21 on their inner side are closed except for a vertical slot as indicated at 21ᵈ, through which is adapted to pass the main cable 11, and on either side of the opening 21ᵈ there are eyebolts 22, adapted to take the cables 23 and 24, which latter are designed for the purpose of operating the supplemental weight member 20, 21, by sliding relatively to the main cable 11. Under conditions where the weight of the pointed piercing member 10 is not sufficient to readily pierce the armor or hull of a sunken vessel or other object to be raised to the surface of the water after the member 10 is lowered it will be seen that the weight member, consisting of the combined plates 20 and 21, may be lowered from the surface of the water, by means of the cables 23 and 24, until its lower extremity shall pass over the conical tapered portion 10ᶜ of the piercing member and come in contact with the peripheral shoulder 10ᵇ thereon.

The preferred manner of operating the device to enable the pointed portion 10ª to pierce the armor or hull of the vessel or other object to be raised is to allow the pointed portion 10ª to come in contact with such parts as are to be pierced and to strike the same a heavy blow due to the weight of the piercing member 10, or the combined weight of this part and the supplementary members 20 and 21. If a pounding action on the piercing device is desired this may be secured by lifting the combined supplementary weight 20, 21 by the cables 23, 24 and allowing the same to descend and strike a penetrating blow on the peripheral shoulder 10ᵇ of the harpoon member 10.

It is preferred that the combined weight of the supplementary weight members 20, 21 shall be about five and one-half tons, which would make the entire weight of the device, exclusive of the cables, about seven tons, although these weights and proportions may be varied according to the conditions involved in any given case where a vessel or other object in relatively deep water is desired to be raised to the surface.

In Fig. 3 the manner of operating the device, which is designated generally by the reference character A, from a boat B or other object floating on the water is graphically illustrated, the cables 11, 23 and 24 being designated generally by the reference character E, the vessel or other object to be raised being indicated by the reference character C.

In the use of my improved device for raising metallic armored vessels in particular, it will be seen that the essential features are the pointed penetrating device 10, the pivoted members or barbs 13, which are designed to engage the inside of the metallic covering or hull while the supplemental weight members 20 and 21 are used for the purpose of adding additional weight to the device in operating it, these parts being separately formed in order to secure economy in manufacture and use, for the reason that any number of pointed devices 10, with their lifting cables 11, may be employed, there being a sufficient number in the case, for example, of raising any given vessel to insure that the combined tensile strength of the cables and the attaching devices 10 shall be sufficient to raise the required load. The devices 10, in combination with the supplementary weights 20 and 21, may be lowered and the piercing device 10 caused to engage the object to be raised in the manner described, after which the supplementary weight members 20 and 21, by the operation of the cables 23 and 24, may be lifted to the surface of the water and utilized in conjunction with another harpoon or piercing member 10 and its corresponding cable 11 to cause the member 10 to be carried to the object to be raised and to pierce the shell or hull of the same for securing an operative engagement therewith, and this operation of such lifting devices may be continued until the requisite number of cables 11 is attached to the hull of the vessel or other object to be raised by the harpoon engaging devices 10, after which, by the operation of the cables 11 the vessel or other object may be raised either to the surface of the water or to any distance from the surface and supported upon one or more floating devices, as boats, barges, or pontoons, whereupon the sunken vessel or object may be towed to any suitable or desired place for docking.

Should it be desired to attach additional lifting cables to the pointed piercing devices 10 this may be accomplished by forming integral with the members 10 one or more arms or extensions, as indicated at 30, Figs. 1 and 2. After the weight members 20 and 21 are lifted and prior to the raising of the object by exerting the maximum pull upon the cable 11, additional lifting cables or chains may be dropped and caught over the projections or arms 30 to assist the cables 11 in lifting the vessel or object to be raised.

In order that the invention might be understood the details of the preferred embodiment have been shown and particularly described, but it is not desired to be limited to the exact details described, for it will be apparent that persons skilled in the art may resort to various modifications without departing from the spirit of the invention.

I claim:

1. The combination of a pointed piercing member provided with a plurality of pivoted members, a cable secured to the upper extremity thereof, a supplementary weight loosely engaging the supporting cable of the piercing member and being adapted to engage with a portion of the upper extremity of the said piercing member.

2. A device of the described character, comprising a conical or tapered shank increasing in diameter gradually from the top toward the bottom thereof and being provided at its lower extremity with a pointed piercing end, pivoted members secured in housings radially arranged near the junction of the shank and pointed portions of said device, a ring slidable along the shank of said device and being adapted to lock said pivoted members in their closed positions, and elastic means for operating said pivoted members to their extended positions when released by said ring.

3. In a device of the described character, the combination with a pointed piercing member, of a plurality of pivoted members secured thereto, a flexible lifting cable secured to the upper extremity of said member, and a supplementary weight being provided with a longitudinally extending interior opening through which the main lifting cable of the said device is adapted to extend, and coöperating engaging means on the said supplementary weight and near the upper extremity of said pointed piercing member.

4. In a device of the described character, the combination with a pointed piercing member, of a plurality of pivoted members secured thereto, a flexible lifting cable secured to the upper extremity of said member, and a supplementary weight being provided with a longitudinally extending interior opening through which the main lifting cable of the said device is adapted to extend, coöperating engaging means on the said supplementary weight and near the upper extremity of said pointed piercing member, and means independent of the cable of the said pointed piercing device for operating said supplementary weight.

5. A device of the described character comprising a pointed piercing member, a cable attached to the upper end of the piercing member and adapted to support the latter, a supplementary weight slidably mounted on said cable and resting on the piercing member, and a cable secured to said supplemental weight and adapted to raise the latter independently of the piercing member.

In testimony whereof I have signed my name to this specification, in the presence of two subscribing witnesses, on this 23d day of April, A. D. 1914.

JOHN T. COWLES.

Witnesses:
ARTHUR L. SPRINKLE,
CHARLES H. SEEM.

Copies of this patent may be obtained for five cents each, by addressing the "Commissioner of Patents. Washington, D. C."